United States Patent Office 2,835,683
Patented May 20, 1958

2,835,683
14α,16α-DIHYDROCORTICOSTERONE AND 21-ESTERS THEREOF

Eugene J. Agnello, Barry M. Bloom, and Gerald D. Laubach, Jackson Heights, N. Y., assignors to Chas. Pfizer & Co., Inc., Brooklyn, N. Y., a corporation of Delaware No Drawing. Application April 1, 1957
Serial No. 649,662

5 Claims. (Cl. 260—397.45)

This invention is concerned with certain novel steroids. In particular, it is concerned with the products formed when 16α,17α-epoxido-Δ⁴-pregnane-21-ol-3,20-dione is subjected to the oxygenating activity of fungi from the genus Curvularia.

It has previously been shown that various steroid compounds, when subjected to the oxygenating activity of fungi from the genus Curvularia, are converted to oxygenated derivatives. Such a process is described and claimed in U. S. Patent 2,658,023. Many of the products so produced are valuable steroid compounds, for example, compound F. It has now been found that this process may be applied to 16α,17α-epoxido-Δ⁴-pregnene-21-ol-3,20-dione and the 21-esters thereof. Among the resulting products are those formed by the introduction of an 11β-hydroxyl group, or of a 14α-hydroxyl group, or of both. The following equations show these reactions. In these formulas R is selected from the group consisting of hydrogen and hydrocarbon acyl groups containing up to about ten carbon atoms.

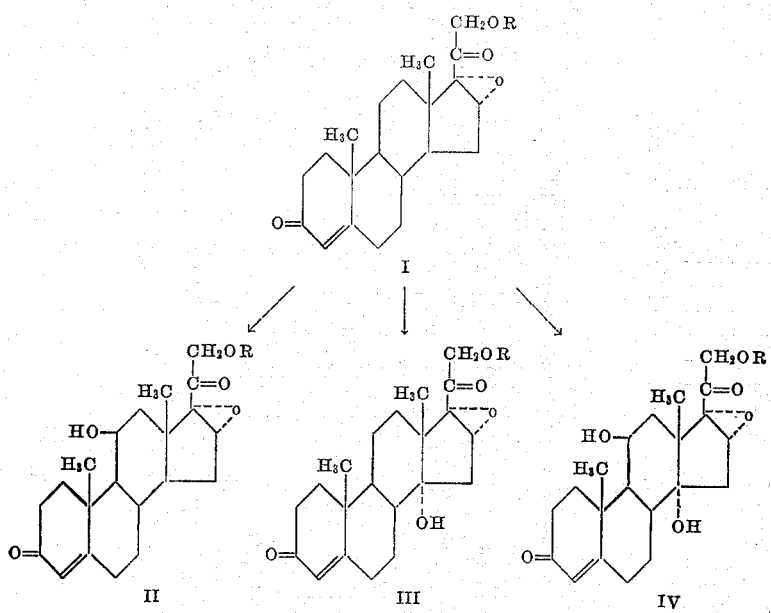

Each of these products is a very valuable compound. In the case of compound II and compound IV, treatment with a hydrogen halide by known means results in the opening of the epoxide ring with the introduction of an hydroxyl group in the 17α-position and a halogen atom in the 16-position. Hydrogen bromide is particularly useful for this purpose. Removal of the bromine substituent by means of zinc or Raney nickel and hydrogen then results in the formation of compound F, in the case of compound II, and of the very valuable biologically active 14α-hydroxy compound F, in the case of compound IV. Compound III, when treated with p-toluenesulfonic acid, loses the 14-hydroxy group and has a double bond introduced at the 14-position. When the epoxide ring of this product is treated as described above, there is formed Δ¹⁴-dehydro compound S, a valuable intermediate for the synthesis of the biologically active Δ¹⁴-dehydro-compound F.

The products obtained by treating compounds III or IV with HX, i. e. a hydrogen halide, are also novel and of particular value as intermediates in the synthesis of 14α-hydroxy F by the route above described. These new compounds may be represented by the formula

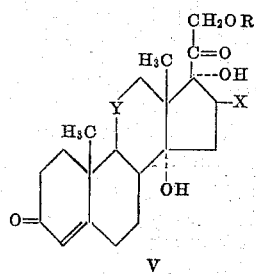

V wherein R has the values hereinbefore indicated, X is the halogen atom (bromine, chlorine, fluorine or iodine), and Y is either a methylene group or the β-hydroxyl group

Still another class of new products is formed when compound IV is treated with weak chromous salts, for instance chromous acetate, in a liquid medium like glacial acetic acid, under mild conditions. The epoxide ring is also broken in this case, but hydrogen is introduced at C17 and an α-hydroxyl group at C16 thus:

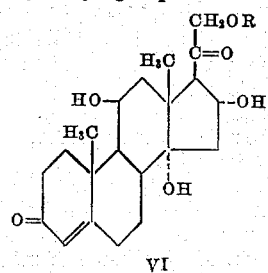

VI

This structure can be named generically as 14α,16α-dihydroxycorticosterone and its 21-esters. This method is described by Julian in J. Org. Chem. 19, 131 (1954), as applied to other compounds, and it is also effective here.

One further series of new steroids is formed when either compound II, compound III or compound IV is treated with aqueous acid by well known procedures. These products can be represented by the general formula

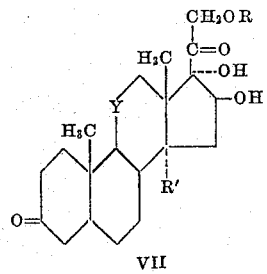

VII wherein R and Y have the meanings hereinbefore established and R' is either hydrogen or hydroxyl. Notable examples of this series are 16β-hydroxy compound F and 14α,16β-dihydroxy compound F and their respective 21-hydrocarbon carboxylic acid esters.

These products of the structural Formulae VI and VII have particular utility as anti-inflammatory agents being even more effective than such compounds as cortisone and hydrocortisone. They are highly active in such standard tests as the rat thymus involution test, mouse liver glycogen test and in various animal anti-inflammatory tests. Furthermore, they have the distinct advantage of not causing salt retention in the tissues.

The following examples are given by way of illustration and are not intended as a limitation of this invention. Indeed, as many apparently widely different embodiments of the present invention may be made without departing from the spirit and scope hereof, it is to be understood that the invention is only limited as defined in the appended claims.

Example I

A culture of the organism *Curvularia lunata* NRRL 2380 was rinsed from an agar slant under sterile conditions into a sterile medium having the following composition:

| | Percent |
|---|---|
| Malt extract | 5 |
| Sucrose | 1 |
| Sodium nitrate | 0.2 |
| Potassium chloride | 0.05 |
| Magnesium sulfate heptahydrate | 0.05 |
| Ferrous sulfate heptahydrate | 0.05 |
| Dipotassium acid phosphate | 0.1 |
| Distilled water, adjusted to pH 7.0 with potassium hydroxide. | |

One hundred milliliters of this medium was used in each of several three hundred-milliliter flasks. To each flask was added 50 milligrams of commercially available 16,17-epoxido-desoxycorticosterone 21-acetate dissolved in a small volume of acetone. Throughout these operations the fermentation mixture was maintained under sterile conditions. The mixture was then shaken for a period of seven days at a temperature of about 28° C. The contents of the flasks were combined and extracted with several portions of ethylene dichloride using one-fifth the volume of the aqueous phase each time. The combined ethylene dichloride extracts were dried over anhydrous sodium sulfate and, after the drying agent was removed, the solvent was removed under vacuum.

The ethylene dichloride concentrate was placed on a chromatographic column consisting of silica gel mixed with a small volume of ethanol (one milliliter of solvent per gram of silica gel). The column was developed by means of a mixture of 97 volumes of methylene chloride and three volumes of 95% ethanol. The effluent from the column was collected in small fractions of equal volume and periodically these were examined by means of paper chromatography in order to separate the fractions containing the desired product. All of these fractions were concentrated under vacuum to dryness to obtain solid products.

These products were identified as the acetates respectively of compounds II, III, and IV above.

Example II

A suspension of the compound III acetate product of Example I was prepared by adding 10 g. of the compound to 100 ml. of glacial acetic acid. To this solution were added 10 ml. of 5 N hydrogen bromide in glacial acetic acid keeping the temperature at 15 to 20° C. The colorless solution was allowed to come to room temperature and held there for 1½ hours. At the end of this period the desired compound was precipitated from the solution by dropwise addition of water and recrystallized from ethyl acetate-petroleum ether. It was identified as $\Delta^4$-pregnene-14α,17α,21-triol-16β-bromo-3,20-dione-21-acetate.

This procedure was repeated, employing instead the acetate of compound IV. The product thus recovered was $\Delta^4$-pregnene-11β,14α,17α,21-tetrol-16β-bromo-3,20-dione-21-acetate.

Each of the acetates of compounds III and IV was similarly treated, but substituting in one set of reactions hydrogen fluoride, and in another hydrogen chloride, and in another hydrogen iodide, in lieu of the hydrogen bromide. The corresponding 16β-fluoro, 16β-chloro- and 16β-iodo-pregnenes were thus obtained.

Example III

Compound IV acetate (.015 mole, 5.8 grams) was placed in 150 ml. of glacial acetic acid at room temperature in a carbon dioxide atmosphere. To this were added an equimolar proportion of chromous acetate in 65 ml. of glacial acetic acid. A clear solution resulted, which was then diluted with water and extracted with methylene chloride. Three 40 ml. extracts were thus obtained. These were combined and washed successively with water, sodium bicarbonate solution and again water. Upon concentration 5 grams of crude 14α,16α-dihydroxycorticosterone-21-acetate was obtained. This was reextracted with 20 ml. acetone and 200 ml. anhydrous ether, refluxed for 15 minutes, filtered and washed with ether to give about 1 gram of purified product.

Example IV

Each of the three acetate products of Example I was treated with dilute aqueous acid by the following procedure: 200 mg. of the epoxide in 10 ml. of tetrahydrofurane was treated with 2 ml. of 3 N perchloric acid. The mixture was stirred at room temperature for six hours. The mixture was then poured into 5% sodium bicarbonate solution. The precipitated product was filtered, washed with water and dried. It was recrystallized from ethyl acetate. The product of the reaction with compound II acetate was 16β-hydroxy compound F acetate; that with compound III was $\Delta^4$-pregnene-14α,16β,17α,21-tetrol-3,20-dione-21-acetate; and that from compound IV was identified as 14α,16β-dihydroxy compound F acetate.

Example V

The free alcohols of the acetates of Examples I through IV were each prepared by hydrolysis by addition of one molar proportion of potassium carbonate to a methanol solution of the acetate. The mixtures were allowed to stand at room temperature one hour. They were then made slightly acidic and precipitated by pouring dropwise into sodium chloride solution, filtered, washed with water, and dried.

Example VI

A variety of esters of the products of Example V were made by treating 5 each of the free alcohols with acylating agents by conventional methods. These included such compounds as the formate, the propionate, the isobutyrate, the hexanoate, the benzoate, the octanoate, the stearate, the hemisuccinate, the trimethylacetate, the cyclohexane carboxylate, and the cyclopentyl propionate.

What is claimed is:

1. A compound having the formula

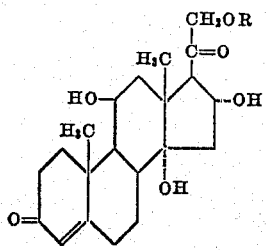

wherein R is selected from the class consisting of hydrogen and hydrocarbon acyl groups containing up to ten carbon atoms.

2. 14α,16α-dihydroxycorticosterone.
3. 14α,16α-dihydroxycorticosterone-21-acetate.
4. 14α,16α-dihydroxycorticosterone-21-hemisuccinate.
5. 14α,16α-dihydroxycorticosterone-21-benzoate.

No references cited.